US012253027B2

(12) United States Patent
Durocher et al.

(10) Patent No.: US 12,253,027 B2
(45) Date of Patent: Mar. 18, 2025

(54) LUBRICANT RESERVOIR WITH INTEGRATED HEAT EXCHANGER

(71) Applicant: Pratt & Whitney Canada Corp., Longueuil (CA)

(72) Inventors: Eric S. Durocher, Boucherville (CA); Gabriel Naccache, Longueuil (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/986,515

(22) Filed: Nov. 14, 2022

(65) Prior Publication Data

US 2024/0159188 A1 May 16, 2024

(51) Int. Cl.
| | | |
|---|---|---|
| *F02C 7/14* | (2006.01) | |
| *F02C 7/18* | (2006.01) | |
| *F01M 5/00* | (2006.01) | |
| *F01M 11/00* | (2006.01) | |

(52) U.S. Cl.
CPC ............. *F02C 7/14* (2013.01); *F02C 7/18* (2013.01); *F02C 7/185* (2013.01); *F01M 5/001* (2013.01); *F01M 5/002* (2013.01); *F01M 2011/0025* (2013.01)

(58) Field of Classification Search
CPC ...................................................... F01M 5/001
See application file for complete search history.

(56) References Cited

U.S. PATENT DOCUMENTS

| | | | | |
|---|---|---|---|---|
| 3,891,059 | A | * | 6/1975 | Jones ............ F01M 5/002 184/104.3 |
| 8,292,116 | B2 | | 10/2012 | Saito |
| 10,352,191 | B2 | | 7/2019 | Weiner |
| 10,578,020 | B2 | | 3/2020 | Kenworthy |
| 2012/0114467 | A1 | * | 5/2012 | Elder ............ F04D 29/584 415/178 |
| 2013/0192254 | A1 | * | 8/2013 | Campbell ........... F02K 3/115 60/785 |
| 2017/0029132 | A1 | | 2/2017 | Beier |
| 2017/0246568 | A1 | | 8/2017 | Sugio |
| 2017/0254268 | A1 | * | 9/2017 | Lord ............... F02C 7/185 |
| 2018/0328285 | A1 | * | 11/2018 | Tajiri ............. F28F 1/325 |
| 2020/0263561 | A1 | | 8/2020 | Cleyet |
| 2020/0271014 | A1 | | 8/2020 | Gebhard |
| 2020/0408107 | A1 | | 12/2020 | Foutch |

FOREIGN PATENT DOCUMENTS

WO  WO-2022197359 A2 * 9/2022

OTHER PUBLICATIONS

EP Search Report for EP Patent Application No. 23209818.6 dated Apr. 22, 2024.

* cited by examiner

*Primary Examiner* — Todd E Manahan
*Assistant Examiner* — Alyson Joan Harrington
(74) *Attorney, Agent, or Firm* — Getz Balich LLC

(57) ABSTRACT

An apparatus is provided for a gas turbine engine. This engine apparatus includes a lubricant reservoir, a lubricant circuit and a compressed air circuit. The lubricant reservoir includes an internal cavity, a compressed air passage and a reservoir wall at least partially forming an outer peripheral boundary of the internal cavity. The internal cavity is configured to contain lubricant. The compressed air passage extends within the reservoir wall along at least a portion of the outer peripheral boundary of the internal cavity. The lubricant circuit is fluidly coupled with the internal cavity. The compressed air circuit is fluidly coupled with the compressed air passage.

17 Claims, 10 Drawing Sheets

LUBRICANT RESERVOIR WITH INTEGRATED HEAT EXCHANGER

TECHNICAL FIELD

This disclosure relates generally to a gas turbine engine and, more particularly, to a heat exchanger for the gas turbine engine.

BACKGROUND INFORMATION

A gas turbine engine may include a heat exchanger such as a cooler for cooling various fluids such as secondary bleed air. A typical cooler is a standalone device arranged outside of a core of the gas turbine engine and mounted to an engine case via mounting brackets. While known coolers have various advantages, there is still room in the art for improvement. There is a need in the art, for example, for a cooler with a reduced impact on gas turbine engine size, weight and/or cost.

SUMMARY

According to an aspect of the present disclosure, an apparatus is provided for a gas turbine engine. This engine apparatus includes a lubricant reservoir, a lubricant circuit and a compressed air circuit. The lubricant reservoir includes an internal cavity, a compressed air passage and a reservoir wall at least partially forming an outer peripheral boundary of the internal cavity. The internal cavity is configured to contain lubricant. The compressed air passage extends within the reservoir wall along at least a portion of the outer peripheral boundary of the internal cavity. The lubricant circuit is fluidly coupled with the internal cavity. The compressed air circuit is fluidly coupled with the compressed air passage.

According to another aspect of the present disclosure, another apparatus is provided for a gas turbine engine. This engine apparatus includes a lubricant reservoir. The lubricant reservoir includes a liner, a shell, a plurality of heat exchange elements, a compressed air passage and an internal cavity configured to contain a quantity of lubricant within the lubricant reservoir. The liner forms at least a first portion of an outer peripheral boundary of the internal cavity. The shell is arranged outboard of and connected to the liner such that a plenum of the compressed air passage is formed by and is disposed between the liner and the shell. The plenum extends along the first portion of the outer peripheral boundary of the internal cavity. Each of the heat exchange elements extends across the plenum between the liner and the shell.

According to still another aspect of the present disclosure, another apparatus is provided for a gas turbine engine. This engine apparatus includes a lubricant reservoir. The lubricant reservoir includes a wall structure, an internal cavity and a compressed air passage. The wall structure forms an outer peripheral boundary of the internal cavity. The wall structure includes a tubular sidewall and a convex endwall connected to the tubular sidewall and enclosing an end of the internal cavity. The compressed air passage extends within the convex endwall along the internal cavity. The wall structure is configured to transfer heat energy through the convex endwall between a quantity of lubricant contained within the internal cavity and a working fluid flowing through the compressed air passage.

The convex endwall may include a shell and a liner. The liner may be connected to the shell and partially form the outer peripheral boundary of the internal cavity. The compressed air passage may be at least partially formed by and may be located between the shell and the liner.

A first of the heat exchange elements may be configured as or otherwise include a pedestal and/or a rail.

The apparatus may also include a heat exchanger configured to transfer heat energy out of a working fluid flowing through the compressed air passage, through the liner and into the quantity of lubricant within the lubricant reservoir.

The reservoir wall may be configured to transfer heat energy from the lubricant contained within the internal cavity into compressed air flowing through the compressed air passage.

The apparatus may also include a compressor section. The compressed air circuit may be configured to receive the compressed air from the compressor section and direct the compressed air into the compressed air passage.

The reservoir wall may include a shell and a liner. The liner may be connected to the shell and at least partially form the outer peripheral boundary of the internal cavity. The compressed air passage may be at least partially formed by and located between the shell and the liner.

The reservoir wall may also include a plurality of heat exchange elements within the compressed air passage between the shell and the liner.

A first of the heat exchange elements may be configured as or otherwise include a pedestal.

A first of the plurality of heat exchange elements may be configured as or otherwise include a rail.

The compressed air passage may extend between a passage inlet and a passage outlet. The compressed air circuit may be fluidly coupled to the passage inlet.

The passage inlet and the passage outlet may be arranged to a common side of the lubricant reservoir.

The passage inlet and the passage outlet may be arranged to opposing sides of the lubricant reservoir.

The compressed air passage may include a plenum and a diffuser between the plenum and the compressed air circuit.

The reservoir wall may also include a plurality of heat exchange elements projecting into the internal cavity.

The first of the heat exchange elements may be configured as or otherwise include a pedestal.

The first of the heat exchange elements may be configured as or otherwise include a rail.

The lubricant reservoir may also include a tubular reservoir sidewall further forming the outer peripheral boundary of the internal cavity. The reservoir wall may be configured as an endwall which is connected to the tubular reservoir sidewall and encloses an end of the internal cavity.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
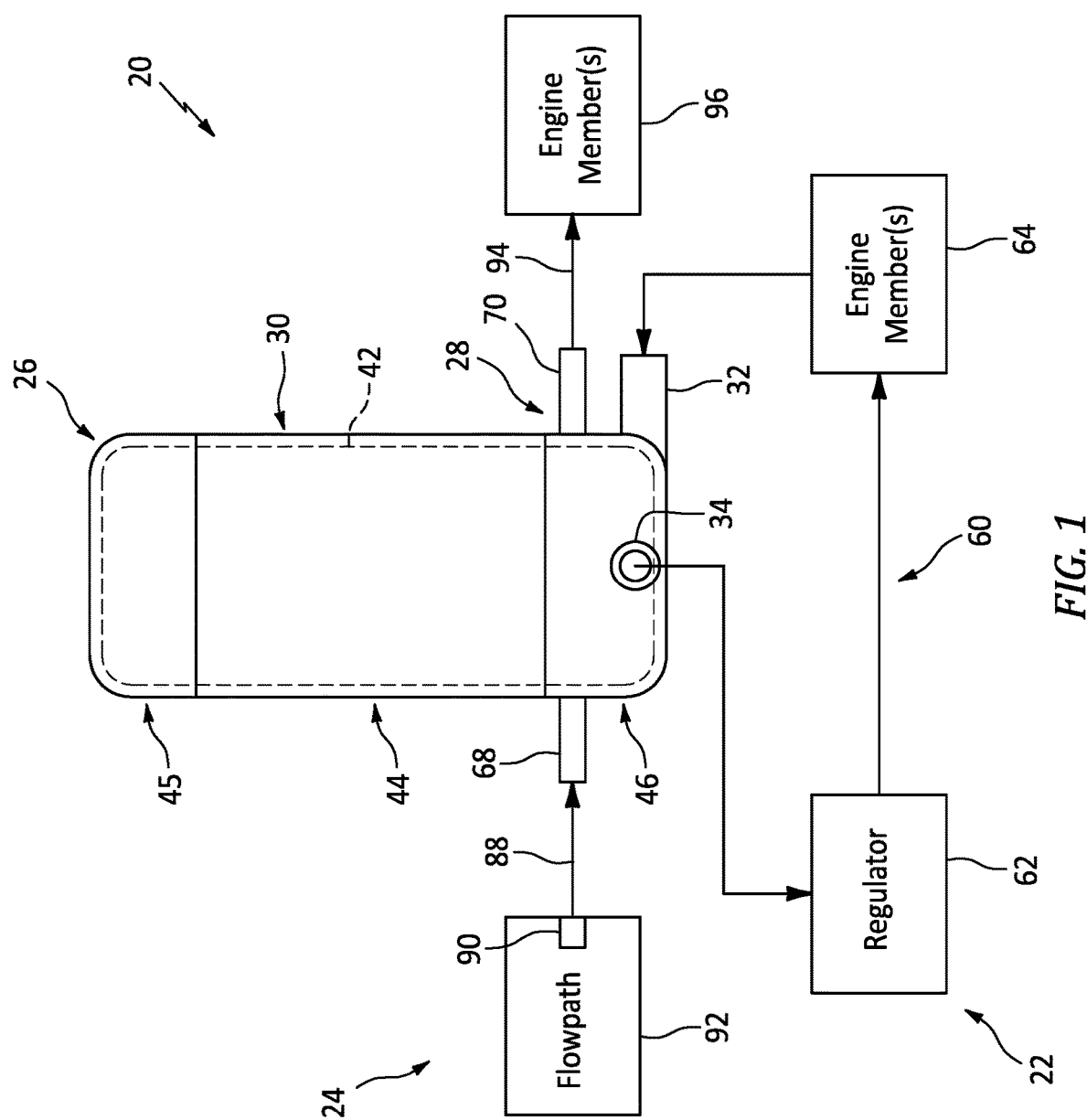
FIG. 1 is a schematic illustration of a system for a gas turbine engine.
Figure 10:
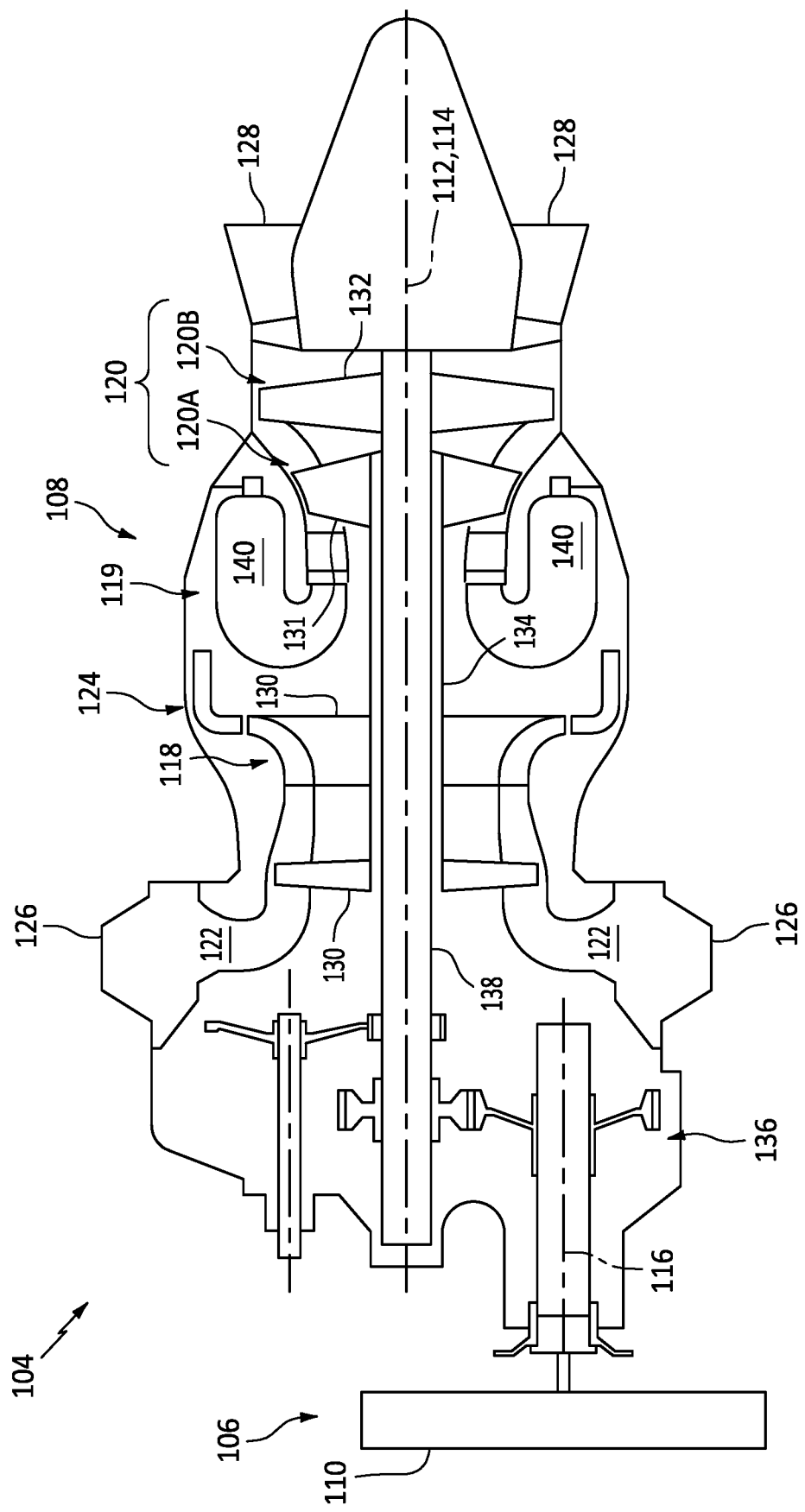
FIG. 10 is a side schematic illustration of a gas turbine engine which may include the engine system of FIG. 1.

FIG. 1 is a schematic illustration of a system 20 for a gas turbine engine; e.g., see FIG. 10. This engine system 20 includes a lubrication system 22 and an air system 24; e.g., a bleed air system, a secondary air system, a cooling air system, etc. The engine system 20, in particular, includes a lubricant reservoir 26 and a heat exchanger 28 integrated with the lubricant reservoir 26. With this arrangement, the heat exchanger 28 may transfer heat energy from relatively warm air (e.g., compressed air) flowing through the heat exchanger 28 into a quantity of relatively cool lubricant (e.g., oil) contained within the lubricant reservoir 26. Such an integrated arrangement may facilitate a reduction in engine size, engine cost, engine assembly complexity, etc. by replacing two traditionally discrete components (e.g., a lubricant reservoir and an air cooler) with a single component—the integrated (e.g., combined) lubricant reservoir/heat exchanger.

Figure 2:
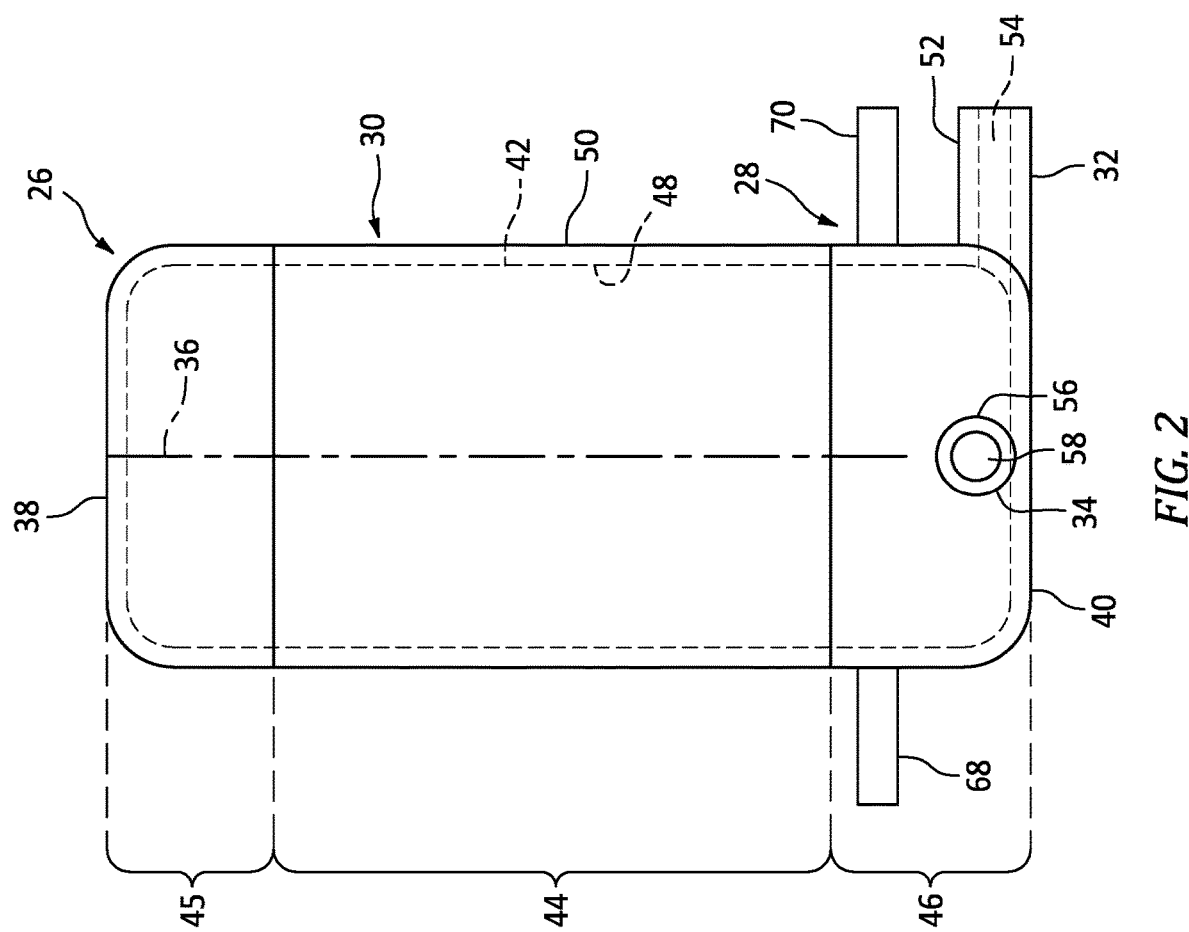
FIG. 2 is an illustration of a lubricant reservoir with an integrated heat exchanger.

Referring to FIG. 2, the lubricant reservoir 26 includes a wall structure 30, a lubricant inlet 32 and a lubricant outlet 34. The wall structure 30 extends longitudinally along a longitudinal centerline 36 of the lubricant reservoir 26 between and to a first end 38 (e.g., a top end) of the lubricant reservoir 26 and a second end 40 (e.g., a bottom end) of the lubricant reservoir 26. This wall structure 30 is configured to form a tank or other container with an enclosed internal cavity 42 for containing the lubricant. The wall structure 30, for example, includes one or more reservoir walls such as a sidewall 44, a first endwall 45 and a second endwall 46.

The sidewall 44 of FIG. 2 extends longitudinally along the longitudinal centerline 36 between and to the first endwall 45 and the second endwall 46. The sidewall 44 extends circumferentially around the longitudinal centerline 36, thereby providing the sidewall 44 with a full-hoop (e.g., tubular) body. The sidewall 44 extends laterally between and to an inner side 48 of the wall structure 30 and an outer side 50 of the wall structure 30. The structure inner side 48 may at least partially or completely form an outer peripheral boundary of the internal cavity 42 within the lubricant reservoir 26.

The first endwall 45 is disposed at (e.g., on, adjacent or proximate) the reservoir first end 38. The first endwall 45 of FIG. 2, for example, extends longitudinally along the longitudinal centerline 36 from the sidewall 44 to the reservoir first end 38. This first endwall 45 may also be welded, brazed and/or otherwise bonded to the sidewall 44. The first endwall 45 may have a channeled (e.g., U-shaped or V-shaped) cross-sectional geometry when viewed, for example, in a reference plane that includes or is parallel with the longitudinal centerline 36 at the first endwall 45. The first endwall 45 extends circumferentially around the longitudinal centerline 36, thereby providing the first endwall 45 with a full-hoop (e.g., cupped) body. The first endwall 45 extends laterally between and to the structure inner side 48 and the structure outer side 50. At least a portion (or an entirety) of the structure inner side 48 formed by the first endwall 45 may be concave. At least a portion (or an entirety) of the structure outer side 50 formed by the first endwall 45 may be convex. With this arrangement, the first endwall 45 is configured to form a first endcap of the lubricant reservoir 26 which caps (e.g., covers, seals, etc.) of a first end (e.g., a top end) of the internal cavity 42.

The second endwall 46 is disposed at the reservoir second end 40. The second endwall 46 of FIG. 2, for example, extends longitudinally along the longitudinal centerline 36 from the sidewall 44 to the reservoir second end 40. This second endwall 46 may also be welded, brazed and/or otherwise bonded to the sidewall 44. The second endwall 46 may have a channeled (e.g., U-shaped or V-shaped) cross-sectional geometry when viewed, for example, in a reference plane that includes or is parallel with the longitudinal centerline 36 at the second endwall 46. The second endwall 46 extends circumferentially around the longitudinal centerline 36, thereby providing the second endwall 46 with a full-hoop (e.g., cupped) body. The second endwall 46 extends laterally between and to the structure inner side 48 and the structure outer side 50. At least a portion (or an entirety) of the structure inner side 48 formed by the second endwall 46 may be concave. At least a portion (or an entirety) of the structure outer side 50 formed by the second endwall 46 may be convex. With this arrangement, the second endwall 46 is configured to form a second endcap of the lubricant reservoir 26 which caps (e.g., covers, seals, etc.) of a second end (e.g., a bottom end) of the internal cavity 42.

The lubricant inlet 32 may be formed by a tubular inlet fitting 52 disposed, for example, at the reservoir second end 40. The lubricant inlet 32 of FIG. 2, for example, is formed by an inlet passage 54. This inlet passage 54 projects through the inlet fitting 52 and the wall structure 30 (e.g., the second endwall 46) to the internal cavity 42. Of course, in other embodiments, the lubricant inlet 32 may alternatively be configured as a port through the wall structure 30. Furthermore, it is contemplated the lubricant inlet 32 may be disposed at various other locations along the wall structure 30 besides at the reservoir second end 40.

The lubricant outlet 34 may be formed by a tubular outlet fitting 56 disposed, for example, at the reservoir second end 40. The lubricant outlet 34 of FIG. 2, for example, is formed by an outlet passage 58. This outlet passage 58 projects through the outlet fitting 56 and the wall structure 30 (e.g., the second endwall 46) to the internal cavity 42. Of course, in other embodiments, the lubricant outlet 34 may alternatively be configured as a port through the wall structure 30. Furthermore, it is contemplated the lubricant outlet 34 may be disposed at various other locations along the wall structure 30 besides at the reservoir second end 40.

Referring to FIG. 1, the lubricant inlet 32 and the lubricant outlet 34 may each fluidly couple the lubricant reservoir 26 and its internal cavity 42 to a lubricant circuit 60 of the lubrication system 22; e.g., a closed loop circuit. For example, the lubricant circuit 60 of FIG. 1 includes a lubricant flow regulator 62 (e.g., a pump and/or a valve) and one or more members 64 (e.g., components, structures, etc.) of the gas turbine engine. The lubricant flow regulator 62 is configured to direct some of the lubricant contained within the lubricant reservoir 26 and its internal cavity 42 to the engine member(s) 64 for lubricating and/or cooling those engine member(s) 64. The lubricant used for lubricating and/or cooling the engine member(s) 64 may then be directed back into (e.g., returned to) the lubricant reservoir 26 and its internal cavity 42. Examples of the engine member(s) 64 include, but are not limited to, a bearing, a gear system, a seal device and another heat exchanger.

Figure 3:
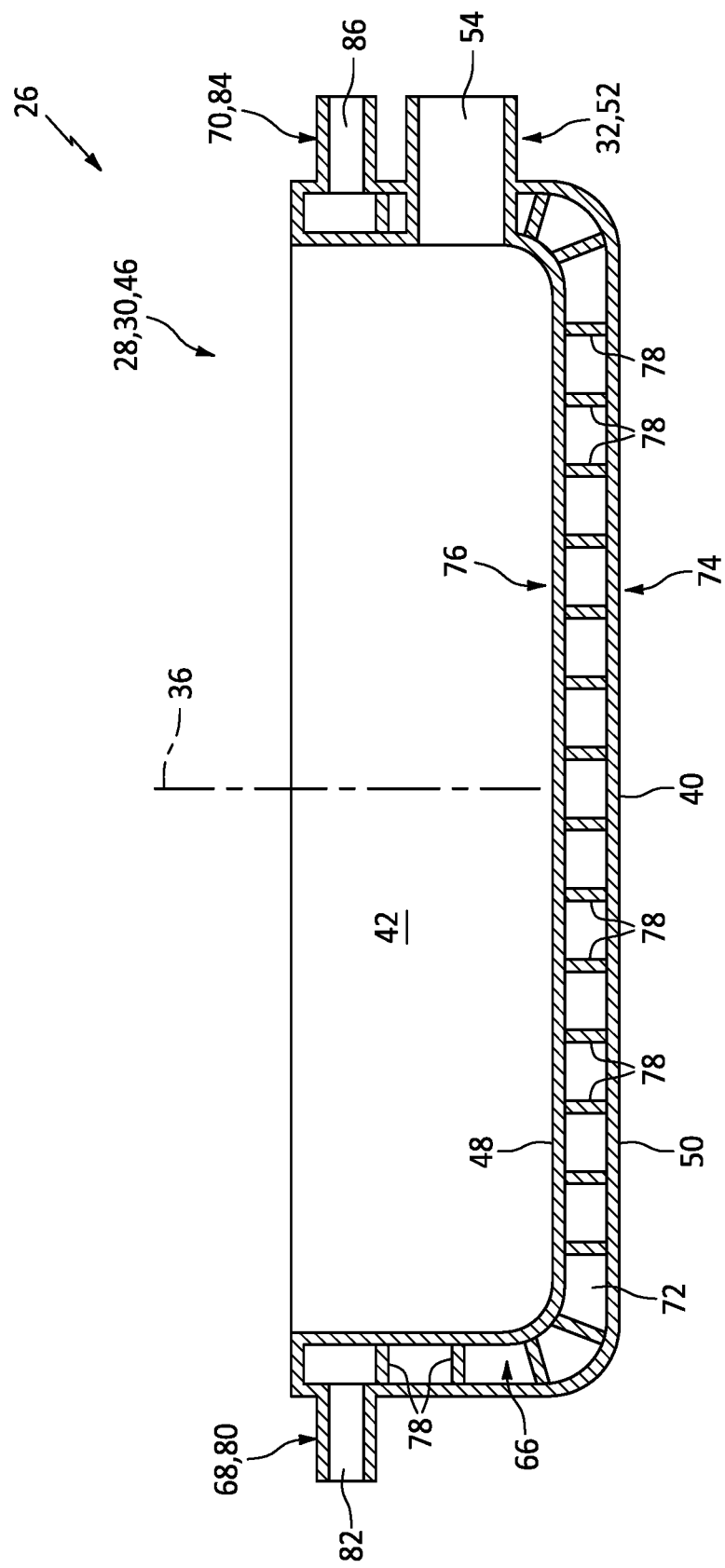
FIG. 3 is a side sectional illustration of an endwall of the lubricant reservoir with the integrated heat exchanger.
Figure 4:
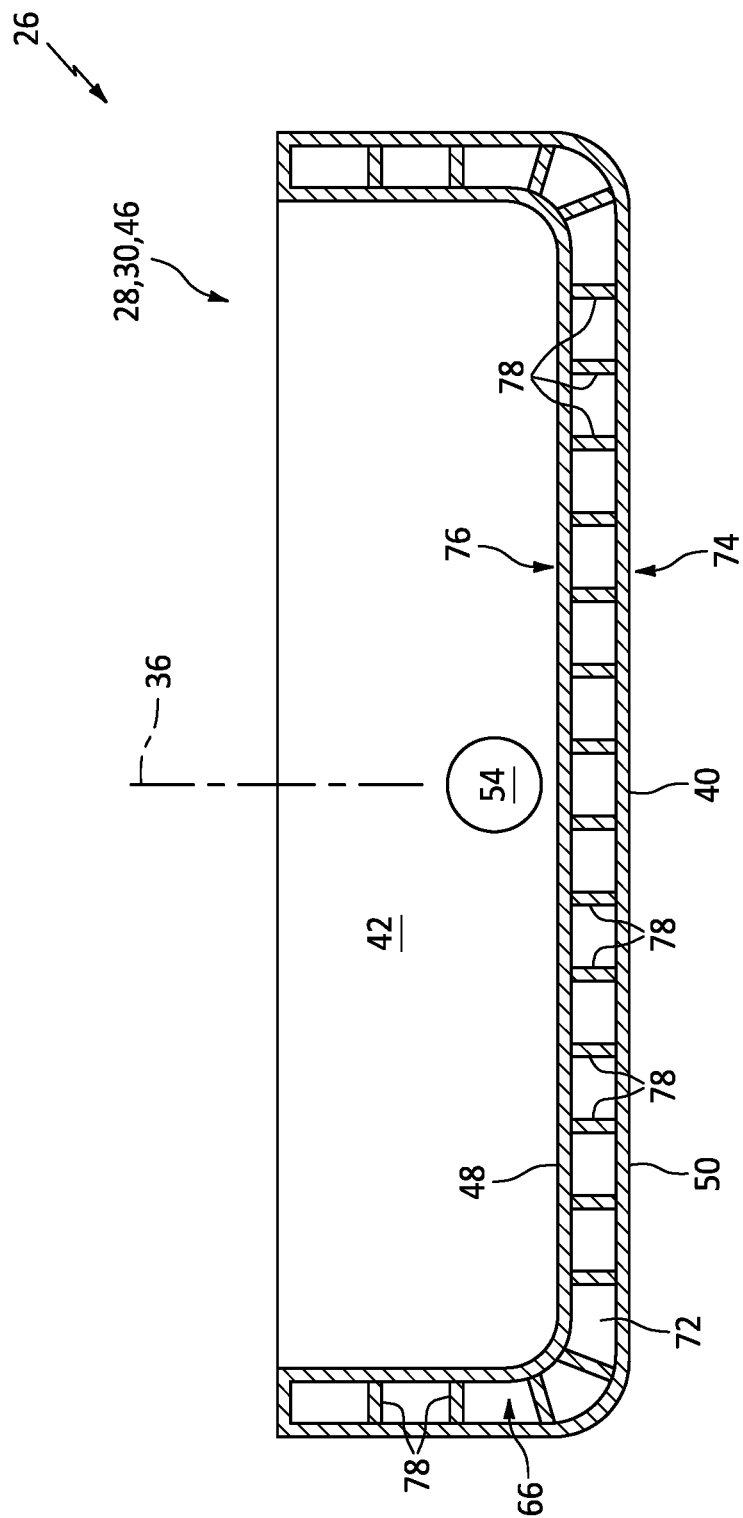
FIG. 4 is another side sectional illustration of the endwall.
Figure 5:
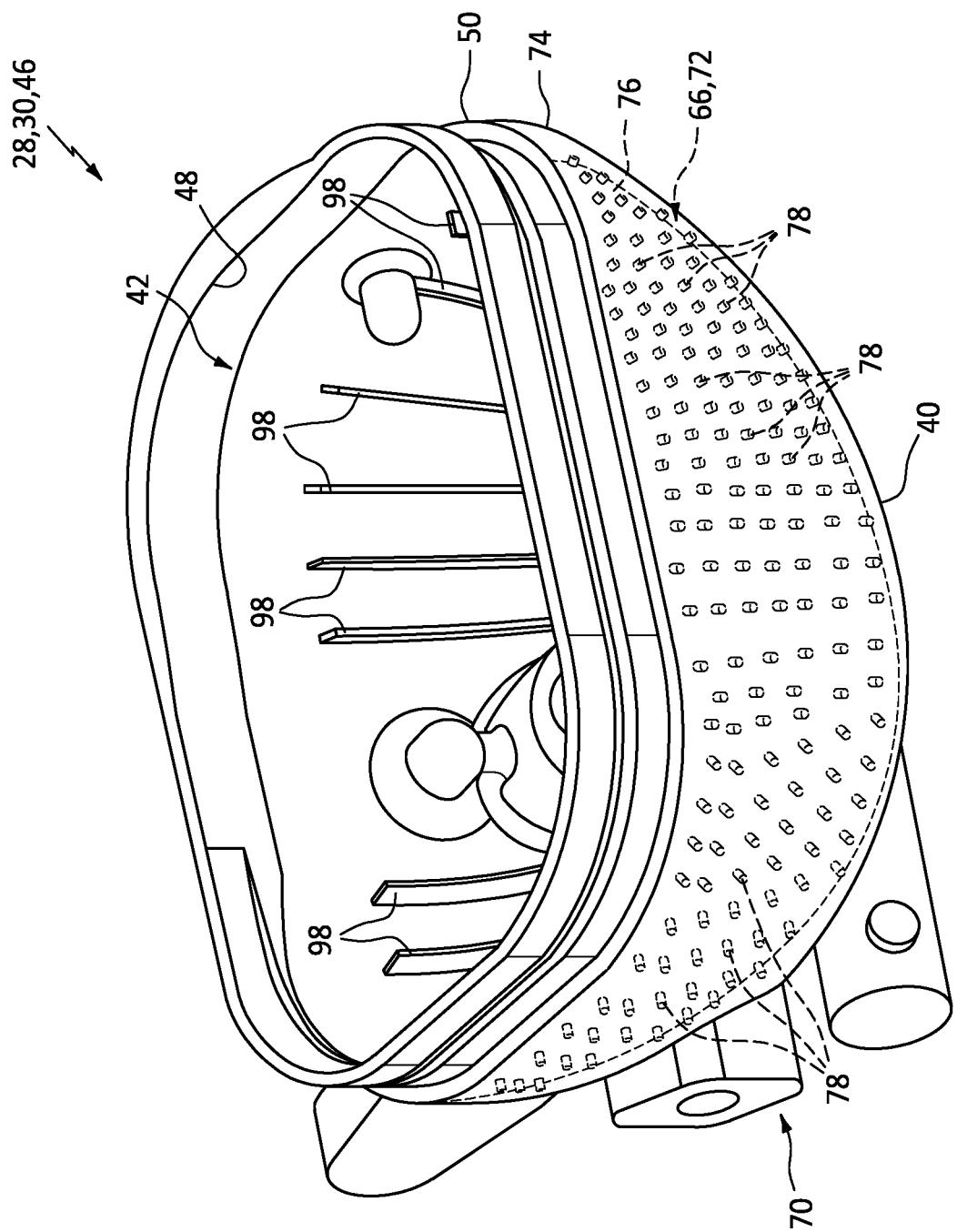
FIGS. 5 and 6 are perspective illustrations of the endwall.
Figure 6:
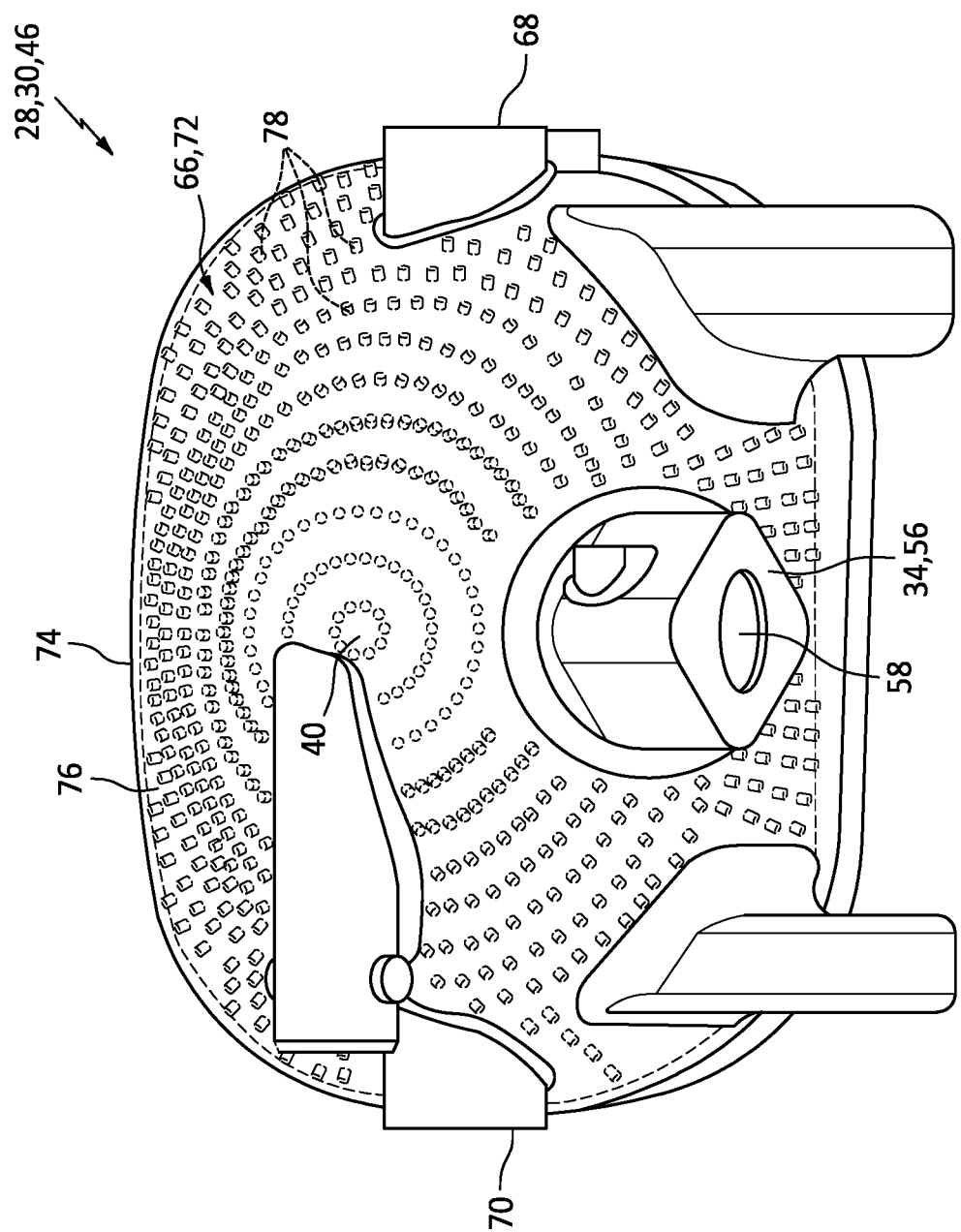

Referring to FIG. 3, the heat exchanger 28 includes a heat exchange passage 66, a heat exchange passage inlet 68 and a heat exchange passage outlet 70. The heat exchange passage 66 extends through the lubricant reservoir 26 (see also FIG. 2) between and to the passage inlet 68 and the passage outlet 70. Referring to FIGS. 3 and 4, the heat exchange passage 66 is formed by (e.g., embedded within) the wall structure 30 proximate the internal cavity 42. The heat exchange passage 66 of FIGS. 3 and 4, for example, includes a plenum 72 (e.g., a laterally expansive volume) that extends within the wall structure 30 along the outer peripheral boundary of the internal cavity 42. The heat exchange passage 66 and its plenum 72 may extend generally circumferentially about the longitudinal centerline 36 providing the heat exchange passage 66 and its plenum 72 with a cup-shaped internal volume; e.g., see FIGS. 5 and 6. The plenum 72 may (or may not be) be interrupted, however, at one or more locations where the lubricant inlet 32 and/or the lubricant outlet 34 extend through the wall structure 30; e.g., see FIG. 6.

The heat exchanger 28 may be integrated into the second endwall 46. The second endwall 46 of FIGS. 3 and 4, for example, includes an external shell 74 and an internal liner 76. The external shell 74 is disposed outboard of and (e.g., completely) overlaps the internal liner 76. An inner side of the external shell 74 is configured to form an outer peripheral boundary of the heat exchange passage 66 and its plenum 72. An outer side of the external shell 74 is configured to form a portion of the structure outer side 50. The internal liner 76 is connected to (e.g., formed integral with or bonded to) the external shell 74. An inner side of the internal liner 76 is configured to form a portion of the structure inner side 48 and, thus, a portion of the outer peripheral boundary of the internal cavity 42. An outer side of the internal liner 76 is configured to form an inner peripheral boundary of the heat exchange passage 66 and its plenum 72. With this arrangement, the heat exchange passage 66 and its plenum 72 extend laterally within the wall structure 30 and its second endwall 46 between the external shell 74 and the internal liner 76.

The heat exchange passage 86 may be a compressed air passage where the heat exchanger 28 is configured to flow compressed air (e.g., high pressure compressor bleed air) through the heat exchange passage 66. For example, a sidewall of the heat exchanger 28 (e.g., a combination of the shell 74 and the liner 76) may be sized and shaped to withstand (e.g., prevent) elastic deformation at operating air pressures between twenty psi and one hundred psi. The present disclosure, however, is not limited to the foregoing exemplary operating air pressures. The heat exchanger 28 and its sidewall may be made from various materials (e.g., depending on air conditions such as temperature and pressure) such as, but not limited to, stainless steel (ss), Inconel, titanium (Ti) or aluminum (Al).

Figure 7B:
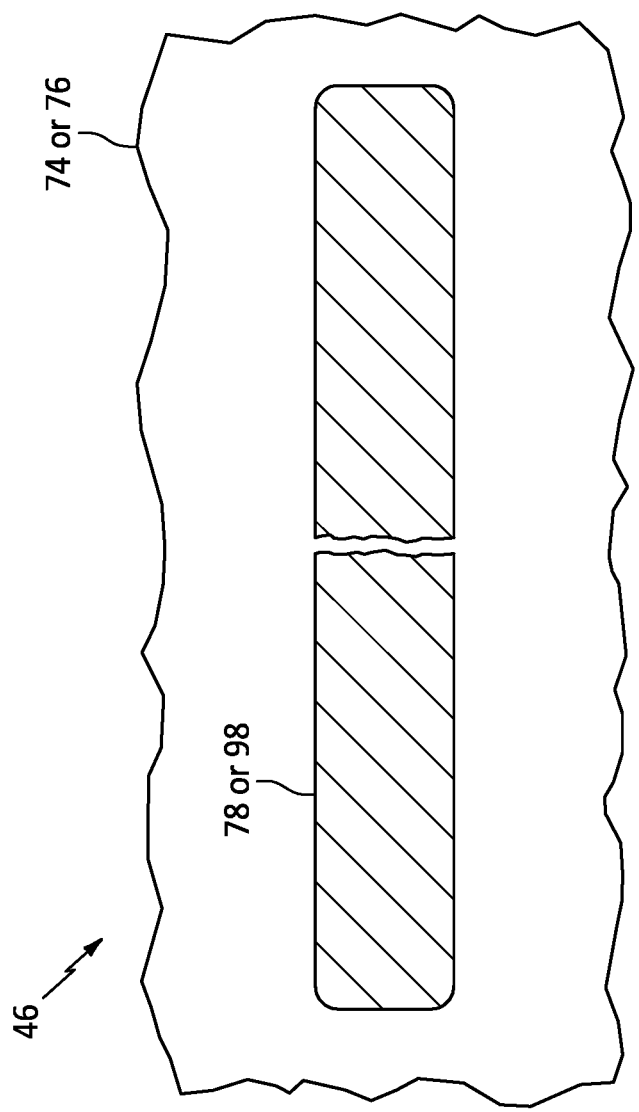
FIGS. 7A and 7B are cutaway illustrations of a portion of the endwall with various heat exchange elements.
Figure 7A:
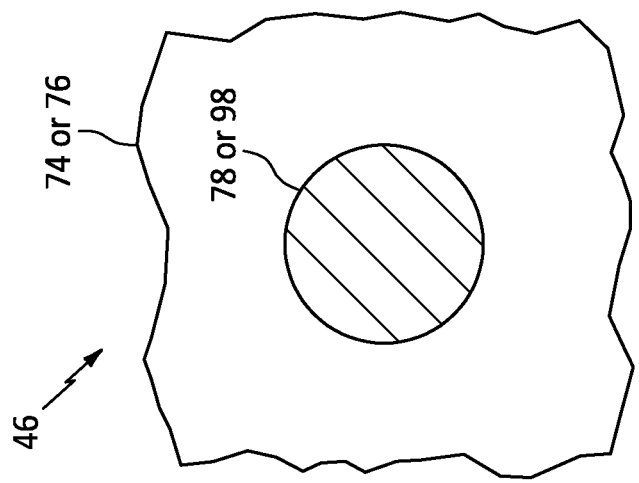

The second endwall 46/the heat exchanger 28 may also include one or more heat exchange elements 78 (only some of which are labeled for ease of illustration). Each of these heat exchange elements 78 is disposed within the heat exchange passage 66 and its plenum 72; see also FIGS. 5 and 6. Each heat exchange element 78, for example, extends laterally across the heat exchange passage 66 and its plenum 72 from the external shell 74 to the internal liner 76. Each heat exchange element 78 may also be connected to (e.g., formed integral with or bonded to) the external shell 74 and the internal liner 76. With such an arrangement, the heat exchange elements 78 increase a surface area of the wall structure 30 that contacts the air flowing through the heat exchange passage 66 during operation. Examples of the heat exchange elements 78 include, but are not limited to, point protrusions such as pedestals (e.g., see FIG. 7A) and elongated protrusions such as fins, strips or other types of rails (e.g., see FIG. 7B). These heat exchange elements 78 may be arranged in an array such that the air flowing through the heat exchange passage 66 may impinge against and/or flow (e.g., pass, weave, etc.) around the heat exchange elements 78 while remaining within a common volume; e.g., the plenum 72. This is in contrast to internal wall which divides a volume into one or more discrete flowpaths. The present disclosure, however, is not limited to the foregoing exemplary wall structure/heat exchange passage arrangement. For example, in other embodiments, at least some of the heat exchange elements 78 may be configured as internal walls that divide the plenum 72 into multiple parallel channels. Furthermore, while each of the heat exchange elements 78 is described as extending across the heat exchange passage 66 and its plenum 72, it is contemplated one, some or all of the heat exchange elements 78 may alternative project partially into the heat exchange passage 66 and its plenum 72 respectively from the external shell 74 and/or the internal liner 76.

Referring to FIG. 3, the passage inlet 68 of may be formed by a tubular inlet fitting 80 disposed, for example, at the reservoir second end 40; see also FIG. 2. The passage inlet 68 of FIG. 3, for example, is formed by an inlet passage 82. This inlet passage 82 projects through the inlet fitting 80 and the external shell 74 to the heat exchange passage 66 and its plenum 72. Of course, in other embodiments, the passage inlet 68 may alternatively be configured as a port through the external shell 74.

The passage outlet 70 of may be formed by a tubular outlet fitting 84 disposed, for example, at the reservoir second end 40; see also FIG. 2. The passage outlet 70 of FIG. 3, for example, is formed by an outlet passage 86. This outlet passage 86 projects through the outlet fitting 84 and the external shell 74 to the heat exchange passage 66 and its plenum 72. Of course, in other embodiments, the passage outlet 70 may alternatively be configured as a port through the external shell 74.

Referring to FIG. 1, the passage inlet 68 may fluidly couple the heat exchange passage 66 to a compressed inlet air circuit 88 of the air system 24. This inlet air circuit 88 is configured to provide the air (e.g., compressed air) to the heat exchanger 28 and its heat exchange passage 66 (see FIG. 3), where the air may be at a pressure multiple times above ambient pressure. The inlet air circuit 88, for example, may include a bleed device 90 (e.g., a scoop or a port) for bleeding air from a (e.g., core) flowpath 92 of the gas turbine engine. The bleed device 90, for example, may be arranged along or downstream of a compressor section of the gas turbine engine. The bleed device 90 may thereby bleed air compressed by the compressor section, and the inlet air circuit 88 may direct that bleed air into the heat exchanger 28 and its heat exchange passage 66 (see FIG. 3) to be cooled using the lubricant within the internal cavity 42.

The passage outlet 70 may fluidly couple the heat exchange passage 66 to a compressed outlet air circuit 94 of the air system 24. This outlet air circuit 94 is configured to provide the air cooled by the heat exchanger 28 to one or more members 96 (e.g., air cooled components, structures, etc.) of the gas turbine engine. Examples of the engine member(s) 96 include, but are not limited to, a bearing compartment, a rotor, a vane array, a shaft and a shroud.

During operation, the internal cavity 42 of FIG. 2 may be filled with relatively cool lubricant. The heat exchanger 28 may receive relatively warm (e.g., compressed) air from the inlet air circuit 88 (see FIG. 1). This relatively warm air is directed into the heat exchange passage 66 of FIG. 3. As the air flows through the heat exchange passage 66, heat energy is transferred from the air, through the wall structure 30 (e.g., the internal liner 76 and the heat exchange elements 78), into the lubricant within the internal cavity 42. The heat exchanger 28 is thereby operable to cool the air using the lubricant within the lubricant reservoir 26; e.g., without any additional heat exchangers outside of the lubricant reservoir 26. Referring to FIG. 1, the cooled air may then be directed from the heat exchanger 28 to the engine member(s) 96.

In some embodiments, referring to FIGS. 3 and 4, the structure inner side 48 (at least along the second endwall 46) may be smooth and/or uninterrupted. In other embodiments, referring to FIG. 5, the wall structure 30 may also include one or more additional heat exchange elements 98. Each of these heat exchange elements 98 may project partially into the internal cavity 42 from the internal liner 76. These heat exchange elements 98 may thereby increase a surface area of the wall structure 30 that contacts the lubricant within the internal cavity 42. Examples of the heat exchange elements 98 include, but are not limited to, elongated protrusions such as fins, strips or other types of rails (e.g., see FIGS. 5 and 7B) and point protrusions such as pedestals (e.g., see FIG. 7A).

Figure 8:
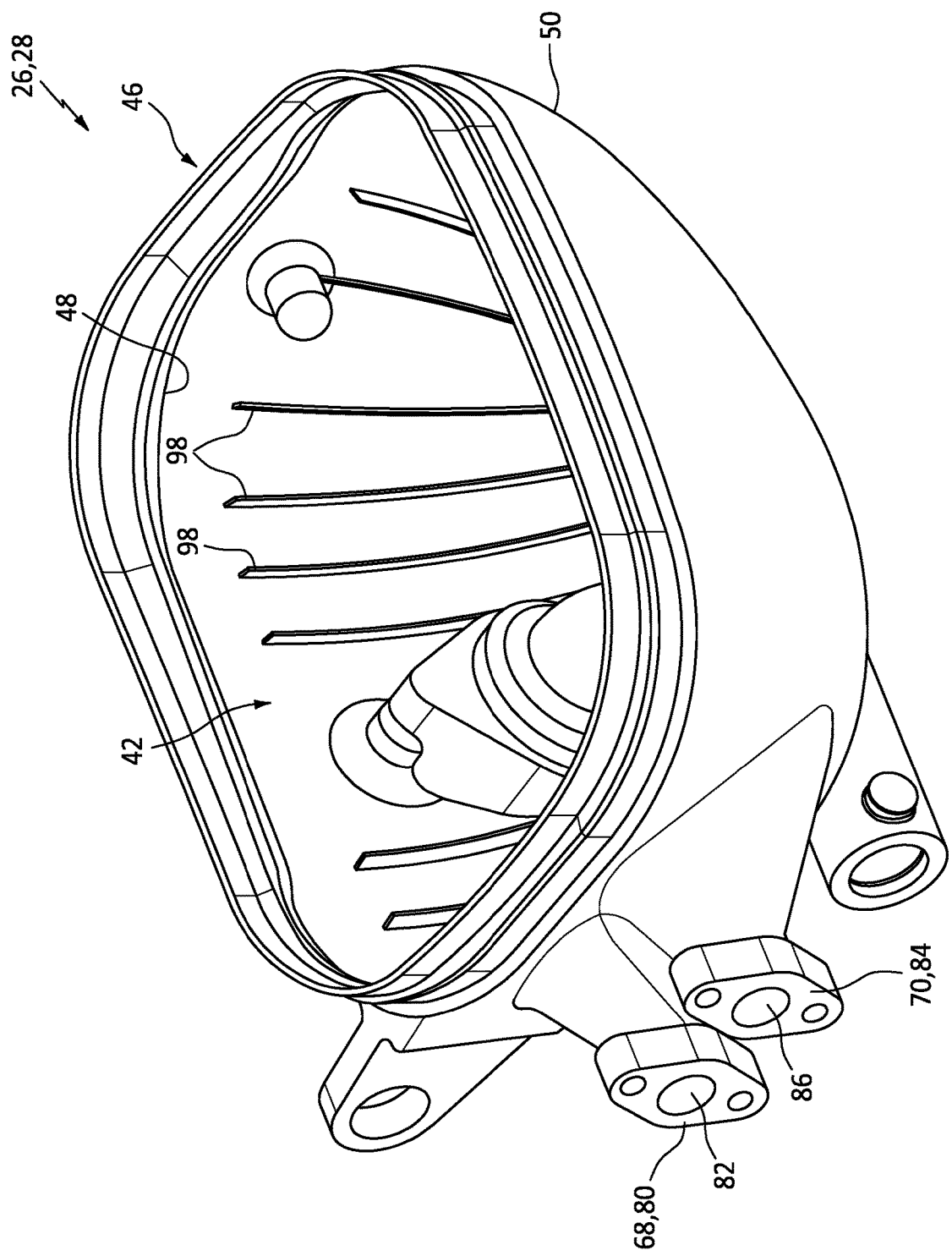
FIG. 8 is a perspective illustration of the endwall with a passage inlet and a passage outlet on a common side of the endwall.

In some embodiments, referring to FIG. 3, the passage inlet 68 and the passage outlet 70 may be arranged to different sides (e.g., opposing sides) of the heat exchanger 28/the lubricant reservoir 26. In other embodiments, referring to FIGS. 8 and 9, the passage inlet 68 and the passage outlet 70 may be arranged to a common (e.g., the same) side of the heat exchanger 28/the lubricant reservoir 26. Such an arrangement may increase a period of time the air is within the heat exchange passage 66 by routing the heat exchange passage 66 circumferentially about the longitudinal centerline 36.

Figure 9:
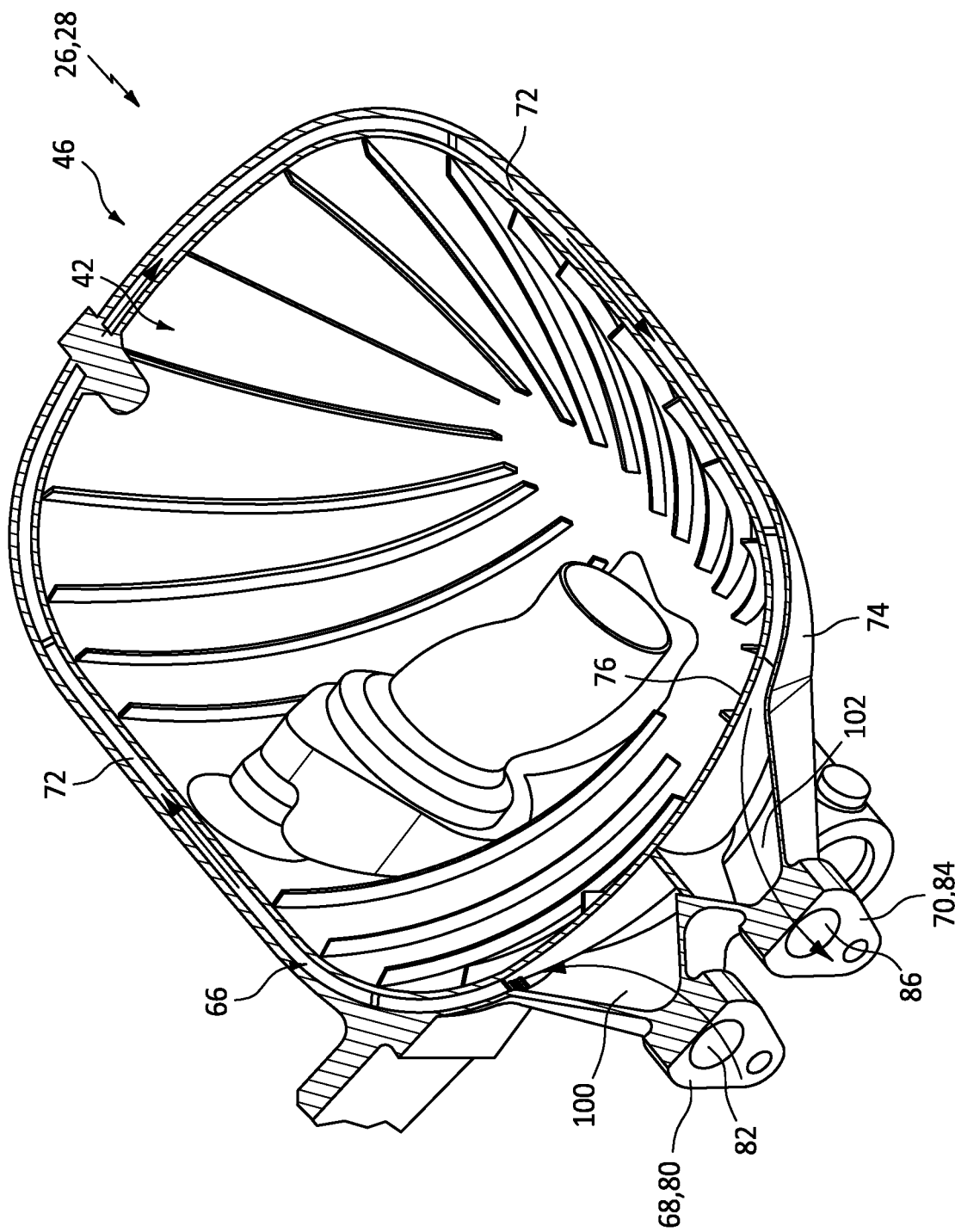
FIG. 9 is a perspective cutaway illustration of the endwall of FIG. 8.

In some embodiments, referring to FIG. 9, the heat exchange passage 66 may include a diffuser 100 between the passage inlet 68 and the plenum 72. Provision of the diffuser 100 may spread out the incoming air and reduce a likelihood of hot spot formation on the internal liner 76 opposite the passage inlet 68. Reducing such a hot spot may also reduce likelihood of lubricant coking onto the internal liner 76 at the structure inner side 48. The heat exchange passage 66 may also or alternatively include a collector 102 between the passage outlet 70 and the plenum 72.

In some embodiments, referring to FIG. 2, the heat exchanger 28 may be integrated with a select portion of the lubricant reservoir 26. The heat exchanger 28 of FIG. 2, for example, is integrated with the second endwall 46 of the wall structure 30. However, in other embodiments, the heat exchanger 28 may alternatively be integrated with another member of the wall structure 30; e.g., the first endwall 45 or the sidewall 44. In still other embodiments, the heat exchanger 28 may be integrated with any two or more wall structure members 44-46 or the entire wall structure 30.

In some embodiments, the wall structure members 44-46 may be formed as discrete bodies and then joined together (e.g., via bonding) to provide the lubricant reservoir 26. Each of these wall structure members 44-46 may be formed via casting, machining, additive manufacturing and/or using various other manufacturing techniques. Alternatively, some or all of the wall structure members 44-46 may be formed together as a single, unitary (e.g., monolithic) body via casting, machining, additive manufacturing and/or using various other manufacturing techniques.

The heat exchanger 28 is generally described above as an air-to-liquid heat exchanger for cooling air. It is contemplated, however, that this integrated lubricant reservoir/heat exchanger may alternatively be used for cooling other working fluids for the gas turbine engine.

FIG. 10 illustrates a gas turbine engine 104 which may include the engine system 20 of FIG. 1. This gas turbine engine 104 includes a mechanical load 106 and a gas turbine engine core 108.

The mechanical load 106 may be configured as or otherwise include at least (or only) one driven rotor 110. This driven rotor 110 may be a bladed propulsor rotor for an aircraft propulsion system. The driven rotor 110, for example, may be a propeller rotor where the gas turbine engine 104 is configured as a turboprop gas turbine engine. The driven rotor 110 may alternatively be a helicopter rotor (e.g., a main rotor) where the gas turbine engine 104 is configured as a turboshaft gas turbine engine. The present disclosure, however, is not limited to turboprop and turboshaft gas turbine engine applications. The gas turbine engine 104, for example, may alternatively be configured as a turbofan gas turbine engine and the bladed rotor may be a fan rotor. In another example, the gas turbine engine 104 may be configured as a turbojet gas turbine engine and the bladed rotor may be a compressor rotor. Furthermore, the present disclosure is not limited to aircraft propulsion system applications. The driven rotor 110, for example, may alternatively be a generator rotor where the gas turbine engine 104 is included in a power generation system for an aircraft or non-aircraft application; e.g., an auxiliary power unit (APU) or an industrial powerplant.

The engine core 108 of FIG. 10 extends axially along an axial centerline 112 of the engine core 108. This axial centerline 112 may be coaxial with a rotational axis 114 of one or more rotors included in the engine core 108. The axial centerline 112 may also be parallel with a rotational axis 116 of the driven rotor 110. The engine core 108 of FIG. 10 includes a compressor section 118, a combustor section 119 and a turbine section 120. The turbine section 120 includes a high pressure turbine (HPT) section 120A and a low pressure turbine (LPT) section 120B.

The engine sections 118-120B are arranged sequentially along a (e.g., annular) core flowpath 122 (e.g., the flowpath 92 of FIG. 1) and within an engine housing 124. This core flowpath 122 extends longitudinally within the engine core 108 from an upstream airflow inlet 126 into the engine core 108 to a downstream airflow exhaust 128 from the engine core 108. Here, the airflow inlet 126 is also an inlet into the gas turbine engine 104 and the exhaust 128 is also an exhaust from the gas turbine engine 104; however, the present disclosure is not limited to such an exemplary arrangement. The engine housing 124 of FIG. 10 includes an engine case (e.g., a core case) housing the compressor section 118, the combustor section 119 and the turbine section 120.

The compressor section 118, the HPT section 120A and the LPT section 120B each include one or more bladed rotors 130-132. Each of these bladed rotors 130-132 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The compressor rotor 130 is connected to and driven by the HPT rotor 131 through a high speed shaft 134. At least (or only) the compressor rotor 130, the HPT rotor 131 and the high speed shaft 134 may collectively form a high speed rotating structure that is rotatable about the rotational axis 114. The driven rotor 110 of FIG. 10 is connected to an output of a geartrain 136. An input of the geartrain 136 is connected to the LPT rotor 132 through a low speed shaft 138. At least (or only) the LPT rotor 132 and the low speed shaft 138 may collectively form a low speed rotating structure that is rotatable about the rotational axis 114. Each of the engine shafts 134 and 138 is rotatably supported by a plurality of bearings (not shown in FIG. 10 for ease of illustration). Each of these bearings is connected to the engine housing 124 by an internal engine support structure.

During gas turbine engine operation, air enters the engine core 108 through the airflow inlet 126 and enters the core flowpath 122. The air within the core flowpath 122 may be referred to as "core air". This core air is compressed by the compressor rotor 130 and directed into a (e.g., annular) combustion chamber 140 of a (e.g., annular) combustor in the combustor section 119. Fuel is injected into the combustion chamber 140 through one or more fuel injectors and mixed with the compressed core air to provide a fuel-air mixture. This fuel-air mixture is ignited and combustion products thereof flow through and sequentially cause the HPT rotor 131 and the LPT rotor 132 to rotate. The rotation of the HPT rotor 131 drives rotation of the compressor rotor 130 and, thus, compression of the air received from the airflow inlet 126. The rotation of the LPT rotor 132 drives rotation of the driven rotor 110.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A gas turbine engine, comprising:
   a liquid lubricant reservoir including an internal cavity, a compressed air passage, a reservoir sidewall and a reservoir wall, the reservoir sidewall extending longitudinally along and circumferentially around a centerline, the reservoir sidewall forming a first portion of an outer peripheral boundary of the internal cavity, the reservoir wall comprising a reservoir endwall, the reservoir endwall connected to a longitudinal first end of the reservoir sidewall and capping a longitudinal first end of the internal cavity, the reservoir endwall forming a second portion of the outer peripheral boundary of the internal cavity, the internal cavity configured to contain liquid lubricant, the reservoir wall includes a shell and a liner, the liner is connected to the shell and at least partially forms the outer peripheral boundary of the internal cavity, the liner and the shell included in a monolithic body, and the compressed air passage extending within the reservoir endwall along at least a portion of the outer peripheral boundary of the internal cavity, and the compressed air passage is at least partially formed by and is located between the shell and the liner;
   a liquid lubricant circuit fluidly coupled with the internal cavity;
   a compressor section of the gas turbine engine;
   a compressed air circuit fluidly coupled with the compressed air passage and configured to receive compressed air from the compressor section and direct the compressed air into the compressed air passage;
   wherein the reservoir wall further includes a plurality of heat exchange elements within the compressed air passage between the shell and the liner; and
   each of the plurality of heat exchange elements extending across the compressed air passage between the liner and the shell, and each of the plurality of heat exchange elements connected to the liner and the shell.

2. The gas turbine engine of claim 1, wherein the reservoir wall is configured to transfer heat energy from the lubricant contained within the internal cavity into the compressed air flowing through the compressed air passage.

3. The gas turbine engine of claim 1, wherein a first of the plurality of heat exchange elements comprises a pedestal.

4. The gas turbine engine of claim 1, wherein a first of the plurality of heat exchange elements comprises a rail.

5. The gas turbine engine of claim 1, wherein
   the compressed air passage extends between a passage inlet and a passage outlet; and
   the compressed air circuit is fluidly coupled to the passage inlet.

6. The gas turbine engine of claim 5, wherein the passage inlet and the passage outlet are arranged to a common side of the lubricant reservoir.

7. The gas turbine engine of claim 5, wherein the passage inlet and the passage outlet are arranged to opposing sides of the lubricant reservoir.

8. The gas turbine engine of claim 5, wherein the compressed air passage includes a plenum and a diffuser between the plenum and the compressed air circuit.

9. The gas turbine engine of claim 1, wherein the reservoir wall further includes a plurality of heat exchange elements projecting into the internal cavity.

10. The gas turbine engine of claim 9, wherein a first of the plurality of heat exchange elements comprises a pedestal.

11. The gas turbine engine of claim 9, wherein a first of the plurality of heat exchange elements comprises a rail.

12. The gas turbine engine of claim 1, wherein
   the lubricant reservoir further includes a second reservoir endwall;
   the second reservoir endwall is connected to a longitudinal second end of the reservoir sidewall and caps a longitudinal second end of the internal cavity, and the second reservoir endwall forms a third portion of the outer peripheral boundary of the internal cavity; and
   the reservoir sidewall extends longitudinally between and to the reservoir endwall and the second reservoir endwall.

13. A gas turbine engine, comprising:
   a compressor section of the gas turbine engine;
   a lubricant reservoir including a liner, a shell, a plurality of heat exchange elements, a compressed air passage and an internal cavity configured to contain a quantity of lubricant within the lubricant reservoir;
   a compressed air circuit configured to receive compressed air from the compressor section and direct the compressed air into the compressed air passage;
   the liner forming at least a first portion of an outer peripheral boundary of the internal cavity;
   the shell arranged outboard of and connected to the liner such that a plenum of the compressed air passage is formed by and is disposed between the liner and the shell, and the plenum extending along the first portion of the outer peripheral boundary of the internal cavity;

each of the plurality of heat exchange elements extending across the plenum between the liner and the shell, and each of the plurality of heat exchange elements connected to the liner and the shell; and the liner, the shell and the plurality of heat exchange elements included in a monolithic body.

14. The gas turbine engine of claim 13, wherein a first of the plurality of heat exchange elements comprises a pedestal or a rail.

15. The gas turbine engine of claim 13, further comprising a heat exchanger configured to transfer heat energy out of the compressed air flowing through the compressed air passage, through the liner and into the quantity of lubricant within the lubricant reservoir.

16. A gas turbine engine, comprising:
a compressor section of the gas turbine engine;
a lubricant reservoir including a wall structure, an internal cavity and a compressed air passage;
the wall structure forming an outer peripheral boundary of the internal cavity, the wall structure including a tubular sidewall and a convex endwall connected to the tubular sidewall and enclosing an end of the internal cavity;

the compressed air passage extending within the convex endwall along the internal cavity, the convex endwall including a liner, a shell, and a plurality of heat exchange elements, each of the plurality of heat exchange elements extending across the compressed air passage between the liner and the shell, and each of the plurality of heat exchange elements connected to the liner and the shell;

the wall structure configured to transfer heat energy through the convex endwall between a quantity of lubricant contained within the internal cavity and a working fluid flowing through the compressed air passage, wherein the working fluid is compressed air bled from the compressor section and directed to the compressed air passage.

17. The gas turbine engine of claim 16, wherein
the liner is connected to the shell and partially forms the outer peripheral boundary of the internal cavity; and
the compressed air passage is at least partially formed by and is located between the shell and the liner.

* * * * *